April 14, 1959   W. H. ST. GERMAIN   2,881,808
AEROSOL VALVE
Filed April 26, 1954   2 Sheets-Sheet 2
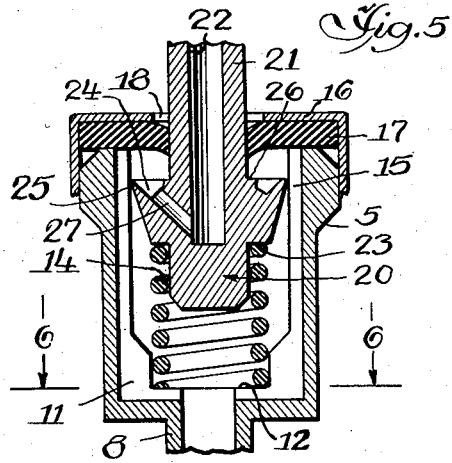
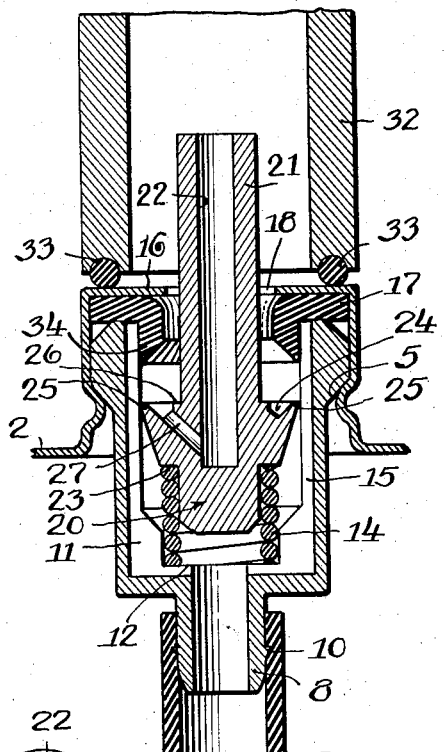
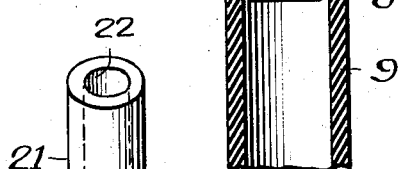
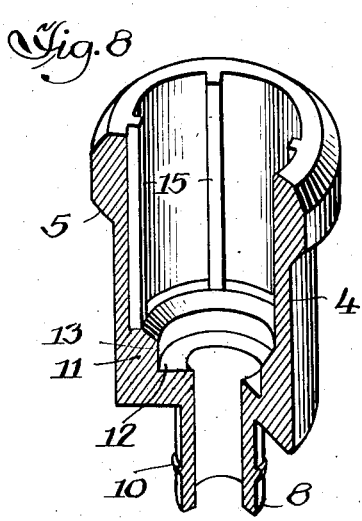
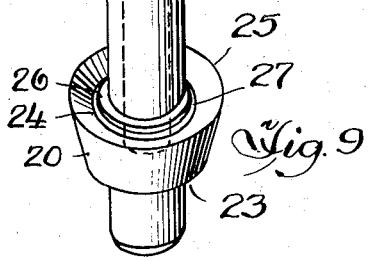
Inventor,
Wilfrid H. St. Germain
By: Schneider & Dressler,
Attys.

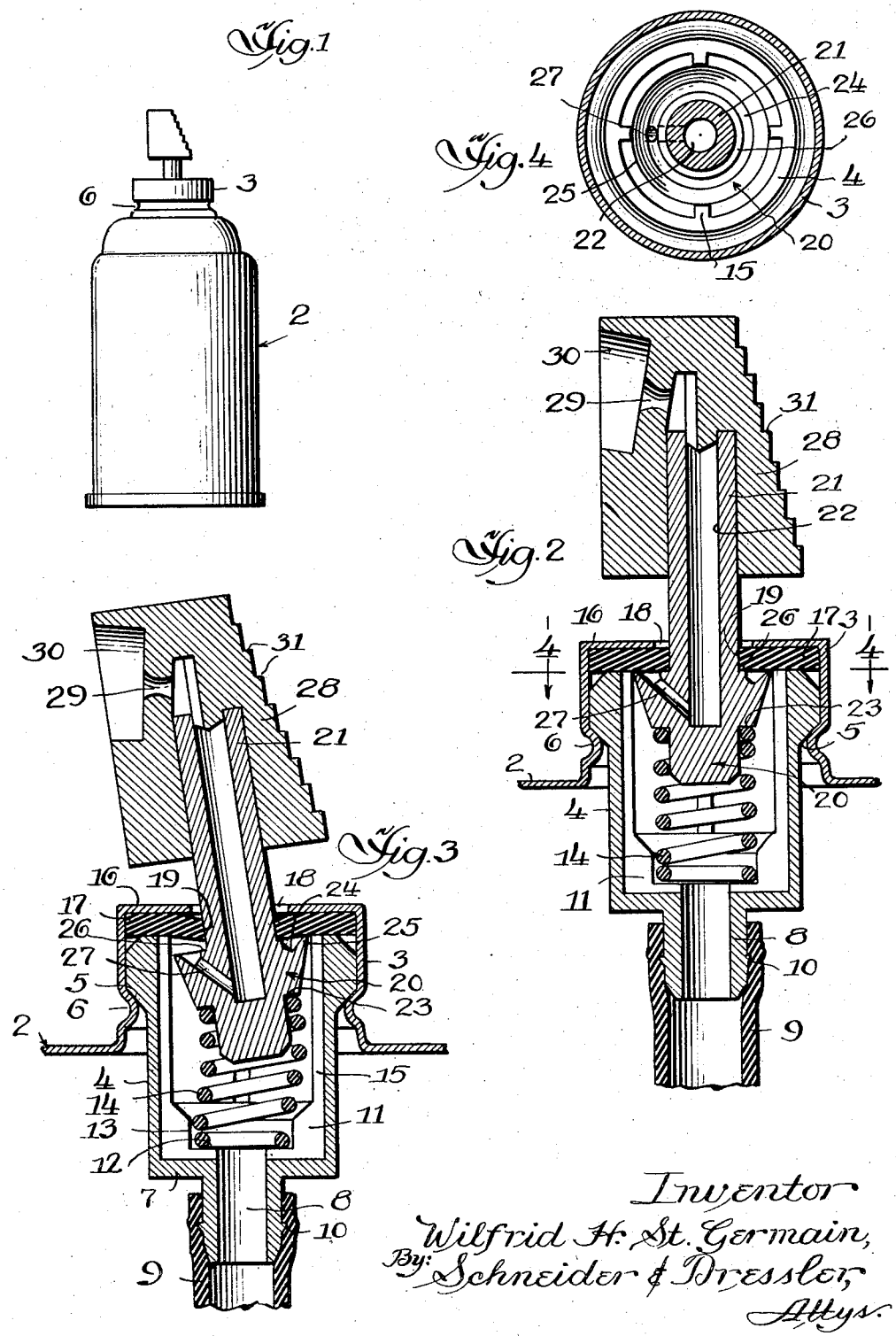

United States Patent Office 2,881,808
Patented Apr. 14, 1959

2,881,808

AEROSOL VALVE

Wilfrid H. St. Germain, Batavia, Ill., assignor to Aerosol Research Company, a corporation of Illinois Application April 26, 1954, Serial No. 425,450

5 Claims. (Cl. 141—21)

This invention relates to an aerosol valve which may be opened by either vertical or lateral pressure to discharge the contents of the container to which it is applied and which permits such container to be filled under pressure.

Aerosol valves are commonly used on containers holding a mixture of an active liquid and a propellent (a mixture of a liquefied gas and gas under pressure). When the valve is opened the pressure of the propellent propels the active liquid through the discharge orifice of the valve which is restricted sufficiently to cause the active liquid to be atomized as a spray into the surrounding atmosphere. The active liquid may be dispersed in the air or it may be deposited on a surface against which it is directed.

Valves of this type are generally provided with a housing mounted adjacent the top of the container. The valve has a tubular valve stem which extends through the top of the container, and a sealing gasket is provided to prevent leakage of the contents of the container when the valve is closed. Since the contents of the container include a gas under considerable pressure it is essential that the seal be airtight and similar devices heretofore used have had comparatively complicated structures in order to provide the necessary security against leakage.

In accordance with the present invention the valve stem is of uniform diameter, so that the sealing gasket may hug it tightly, regardless of the angle to which the valve may be pressed in order to open it for discharge of the contents of the container through the discharge orifice of the valve stem. When the valve stem is pressed laterally to open the valve the sealing gasket is not flexed to any substantial extent, and the gasket is not subjected to the fatigue which occurs when the sealing gasket must be flexed considerably every time the valve is opened or closed. Sealing gaskets that are flexed to a substantial extent every time the valve is operated may lose their resiliency and become ineffective after a comparatively short period of use.

The uniform diameter of the valve stem has another advantage over valve stems that are reduced in diameter adjacent the sealing gasket in that it provides additional strength to protect the valve stem against breakage when lateral pressure is applied to it.

The structure by which the above and other advantages of the invention are attained will be described in the following specification, taken in conjunction with the accompanying drawings showing a preferred illustrative embodiment of the invention, in which:

Figure 1 is a side elevational view of a container to which an aerosol valve embodying the invention has been applied;

Fig. 2 is a fragmentary cross sectional view through an aerosol valve embodying the invention, the valve being shown in closed position;

Fig. 3 is a view, similar to Fig. 2, showing the spray tip pressed laterally and the valve in open position;

Fig. 4 is a cross sectional view, taken along the line 4—4 of Fig. 2;

Fig. 5 is a fragmentary cross sectional view with the valve pressed vertically downward to open position;

Fig. 6 is a cross sectional view, taken along the line 6—6 of Fig. 5;

Fig. 7 is a fragmentary cross sectional view of the valve in open position to permit pressure filling of the container to which the valve is applied;

Fig. 8 is a detail perspective view of the valve housing with a portion cut away to show the interior structures; and Fig. 9 is a detail perspective of the valve.

In the drawings, the reference numeral 2 indicates a container of any suitable material provided with a centrally disposed boss 3 projecting upwardly therefrom. It is obvious that the shape of container 2 is not important, but boss 3 serves as a convenient means of supporting a valve housing 4. In the embodiment illustrated, housing 4 is provided with an annular shoulder 5, and boss 3 is provided with an inwardly extending circumferential rib 6 which serves to hold the valve housing in place. Valve housing 4 is open at its top, and its bottom wall 7 has depending therefrom a tubular extension 8 which constitutes a flow channel. A dip tube 9, secured at its upper end to extension 8 in any suitable manner, extends downwardly into proximity to the bottom of container 2. The outer surface of depending tubular extension 8 is provided with an annular rib 10 which is engaged by dip tube 9 to prevent the dip tube from sliding off extension 8. Instead of using a single annular rib to keep tube 9 in engagement with extension 8, a plurality of individual projections may be used.

The interior of valve housing 4 is built up adjacent its bottom, as indicated at 11, to form a spring seat 12. The built up portion 11 is shaped annularly with a short vertical wall portion 13 forming a guide for positioning a coiled compression spring 14 on the seat. Valve housing 4 is also provided with a plurality of vertically extending interior ribs 15 extending from the upper edge of built up portion 11 to the upper edge of the valve housing. The upper edge of valve housing 4 is spaced a short distance below the top wall 16 of boss 3, and a sealing gasket 17, positioned on top of the upper edge of the valve housing, engages the lower surface of top wall 16. Top wall 16 is provided with a centrally disposed opening 18, and gasket 17 is provided with an opening 19 slightly smaller than opening 18 and aligned therewith.

A valve body 20, positioned in housing 4, has a stem 21 projecting upwardly through openings 19 and 18. The outer diameter of stem 21 is of a size to be tightly hugged by the edge of sealing gasket 17 defining aperture 19. Valve stem 21 is provided with a longitudinal bore 22 terminating within valve body 20. Valve body 20 is shaped like the frustrum of an inverted cone and is cut away to provide a shoulder 23 forming a seat for the upper end of spring 14.

The diameter of the upper end of valve body 20 is substantially equal to the distance between the inner edges of diametrically opposite ribs 15 so that the ribs act as a guide when valve body 20 moves vertically upwardly, to insure proper seating of the valve body against the underside of gasket 17. The top surface of valve body 20 is recessed to form an annular groove 24 leaving a thin annular rim 25 and a shoulder 26 adjacent valve stem 21. Rim 25 and shoulder 26 both seat against the underside of sealing gasket 17. Valve body 20 is provided with an internal orifice 27 extending from the bottom of groove 24 to bore 22, and forming a passageway between the interior of valve housing 4 and bore 22 when the seal between rim 25 and sealing gasket 17 is broken.

A spray tip 28 is mounted on valve stem 21 and is provided with a terminal orifice 29 connecting bore 22 with discharge opening 30. Spray tip 28 engages the top edge of valve stem 21 so that vertical pressure exerted downwardly on the spray tip forces the valve stem downwardly. The bottom of spray tip 28 is spaced above top wall 16 a distance sufficient to allow for downward movement of the spray tip and valve stem. The spray tip may be of any desired shape. In the illustrated embodiment the side opposite the discharge opening is inclined downwardly and outwardly by a series of small steps 31 to provide a surface easily engageable by the user's thumb to deflect the valve stem from its vertical position. The spray tip may be rotatable relative to valve stem 21, if desired, so that discharge opening 30 may be faced in any direction.

The contents are normally maintained in container 2 by the engagement of sealing gasket 17 with the valve body and valve stem. When spray tip 28 is pressed downwardly valve body 20 is forced downwardly against the action of spring 14 to move rim 25 away from the undersurface of gasket 17, as shown in Fig. 5. When the spray tip is pressed laterally it moves a portion of rim 25 away from gasket 17, as shown in Fig. 3. The net result of these two actions is the same. The rim 25 engages ribs 15, but the spaces between ribs 15 allow free communication between the interior of housing 4 and orifice 27 when valve body 20 is separated from gasket 17. When the spray tip is pressed laterally the position of orifice 27 does not make any difference in the spraying action because groove 24 always allows communication between orifice 27 and the interior of the valve housing.

When valve stem 21 is moved either downwardly or laterally it will be noted that sealing gasket 17 does flex slightly. However, the amount of this flexure is so slight that it does not have any deleterious effect upon the gasket. The gasket is not tapered adjacent valve stem 21 and valve stem 21 is of uniform diameter throughout its length, so that the full thickness of gasket 17 tightly hugs the outer surface of the valve stem regardless of the angle to which the valve stem may be pressed, to provide an efficient seal that prevents leakage of the contents of the container when the valve stem is angularly displaced. The only way the contents may pass from the container to the atmosphere is through orifice 27, bore 22, terminal orifice 29 and discharge opening 30. Whenever the pressure, either vertical or lateral, displacing valve body 20 from sealed engagement with gasket 17 is released, spring 14 immediately forces the valve body back to its normal, sealed position.

Means for filling container 2 under pressure is shown in Fig. 7. A pressure filler connector tube 32 is pressed against top wall 16 surrounding opening 18 with a connector tube seal 33 pressed into sealing engagement between top 16 and the lower edge of tube 32 in any suitable manner. Gas forced downwardly through tube 32 passes through annular aperture 18 to exert force against the contiguous portion of gasket 17. The gas pressure forces the inner edge of gasket 17, defining aperture 19, downwardly, as indicated at 34, and forces valve body 20 down against spring 14 until the spring is completely collapsed. The gas then flows through the opening in gasket 17, through the spaces between ribs 15, through flow channel 8 and dip tube 9 into the body of container 2. Release of filling pressure allows the pressure of the contents and the force of spring 14 to move valve body 20 back into its normal sealing position. The filling operation above described is not limited to the original filling operation, but may be utilized also to refill containers that have been emptied of their contents.

Although I have described a preferred embodiment of my invention in considerable detail, it will be understood that the description thereof is intended to be illustrative, rather than restrictive, as many details may be modified or changed without departing from the spirit or scope of the invention. For example, the lower seat for spring 14 may be formed differently, as by providing an upstanding flange or by extending the lower portions of ribs 15 inwardly so that their inner edges confine the lower portion of the spring. It is also possible to omit ribs 15 and provide space for the passage of the contents between the outer edge of the valve and the inner wall of the valve housing, when the valve is displaced, by providing recesses or grooves in the wall of the valve housing. Accordingly, I do not desire to be restricted to the exact construction described.

I claim:

1. An aerosol valve comprising a solid, one-piece valve body, a valve stem of uniform diameter integral with said valve body, said valve stem projecting from said valve body and provided with a longitudinal bore, extending downwardly into said valve body and terminating below the upper end of said valve body, the upper end of said valve body projecting laterally beyond the outer circumference of said valve stem at right angles to said stem, said laterally projecting upper end being provided with an annular groove, an annular rim portion of said valve body defining the outer edge of said annular groove, an annular shoulder portion of said valve body adjacent the outer surface of said valve stem defining the inner edge of said annular groove, said rim and shoulder portions being adapted to be seated in sealing engagement with a sealing gasket, and an internal orifice extending through said valve body, one end of said orifice being positioned in said annular groove and the other end of said orifice communicating with the longitudinal bore in said valve stem below the upper end of said valve body.

2. An aerosol valve comprising a valve housing having an open top and an opening in its bottom, an annular sealing gasket of uniform thickness positioned on the top edge of said valve housing, a solid, one-piece valve body positioned in said valve housing, the upper surface of said valve body seating against the underside of said annular sealing gasket, a tubular valve stem of uniform cross section extending from said valve body upwardly through said annular sealing gasket, said gasket tightly hugging the outer surface of said valve stem, the upper surface of said valve body having an annular groove dimensioned to provide clearance for the inner edge of said sealing gasket upon downward deflection of the inner edge of said sealing gasket whereby said valve body is vertically displaceable in a downward direction by external gas pressure exerted against the inner edge of said sealing gasket externally of said valve stem, and an internal orifice extending through said valve body and communicating with the interior of said tubular valve stem.

3. An aerosol valve for use with a container having an opening in its top, a valve housing having an open top aligned with the opening in the top of the container and an opening in its bottom communicating with the interior of the container, a sealing gasket extending across the open top of said valve housing, a valve body positioned in said housing and having its top surface seated against the underside of said gasket, the top surface of said valve body being provided with an annular groove, a tubular valve stem of uniform cross section projecting upwardly from the upper surface of said valve body through said sealing gasket, the open top of said housing, and the opening in said container, said annular groove being dimensioned to provide clearance for the inner edge of said sealing gasket upon downward deflection of the inner edge of said sealing gasket whereby said valve body is displaceable from said sealing gasket by external gas pressure exerted against the inner edge of said sealing gasket externally of said valve stem to permit filling of said container, and an internal orifice extending through said valve body between said tubular valve stem and said annular groove, said valve body being displaceable from said gasket to expose a portion of said groove by vertical or lateral pressure against said valve stem, whereby the contents of said container are forced by pressure of said contents through the opening in the bottom of said housing, the internal orifice, and the tubular valve stem, into the atmosphere.

4. An aerosol valve comprising a valve housing having an open top, an opening in its bottom, and a plurality of circumferentially spaced inwardly extending vertical ribs, an annular sealing gasket of uniform thickness positioned on the top edge of said valve housing, a valve body positioned in said housing, said valve body tapering in width with its widest portion fitting between the inner edges of said ribs, a valve stem of uniform diameter projecting from said valve body and provided with a longitudinal bore, the upper end of said valve body projecting laterally beyond the outer circumference of said valve stem, said laterally projecting upper end being provided with an annular groove, an annular rim portion of said valve body defining the outer edge of said annular groove, an annular shoulder portion of said valve body adjacent the outer surface of said valve stem defining the inner edge of said annular groove, said rim and shoulder portions being adapted to be seated in sealing engagement with said sealing gasket, and an internal orifice extending through said valve body and connecting said annular groove and the longitudinal bore in said valve stem.

5. An aerosol valve comprising a valve housing having an open top, an opening in its bottom, and a plurality of circumferentially spaced inwardly extending vertical ribs, an annular sealing gasket of uniform thickness positioned on the top edge of said valve housing, a valve body positioned in said housing, said valve body tapering in width with its widest portion fitting between the inner edges of said ribs, said valve body being recessed intermediate its length to form a downwardly facing shoulder, a spring seat in the lower portion of said valve housing, a spring having its lower end positioned in said seat and its upper end bearing against said shoulder to urge said valve body upwardly into sealing engagement with said gasket, a valve stem of uniform diameter projecting from said valve body and provided with a longitudinal bore, the upper end of said valve body projecting laterally beyond the outer circumference of said valve stem, said laterally projecting upper end being provided with an annular groove, an annular rim portion of said valve body defining the outer edge of said annular groove, an annular shoulder portion of said valve body adjacent the outer surface of said valve stem defining the inner edge of said annular groove, and an internal orifice extending through said valve body and connecting said annular groove and the longitudinal bore in said valve stem.

References Cited in the file of this patent
UNITED STATES PATENTS

| 2,570,909 | Benson | Oct. 9, 1951 |
| 2,582,262 | Loven | Jan. 15, 1952 |
| 2,631,814 | Abplanalp | Mar. 17, 1953 |
| 2,667,991 | Boyer | Feb. 2, 1954 |
| 2,709,111 | Green | May 24, 1955 |